United States Patent

[11] 3,609,048

| [72] | Inventor | Allen Strickler<br>Fullerton, Calif. |
|---|---|---|
| [21] | Appl. No. | 879,883 |
| [22] | Filed | Nov. 25, 1969 |
| [45] | Patented | Sept. 28, 1971 |
| [73] | Assignee | Beckman Instruments, Inc. |

[54] SELF CLEANING SAMPLE CELL FOR RADIANT ENERGY ANALYZERS
1 Claim, 3 Drawing Figs.

| [52] | U.S. Cl. | 356/246 |
|---|---|---|
| [51] | Int. Cl. | G01n 1/10 |
| [50] | Field of Search | 356/103, 246, 208, 201, 207; 250/218 |

[56] References Cited
UNITED STATES PATENTS

| 2,732,753 | 1/1956 | O'Konski | 356/207 |
| 3,504,183 | 3/1970 | Salkowski | 356/103 |

Primary Examiner—William L. Sikes
Assistant Examiner—Orville B. Chew, II
Attorneys—P. R. Harder and R. J. Steinmeyer ABSTRACT: There is disclosed a self-cleaning flow-through sample cell through which a sample fluid is conducted for analysis in a radiant energy analyzer. A fluid-combining assembly is provided to establish laminar flow of a carrier fluid in a sheath around a core of sample fluid. A conduit is connected to the fluid combining assembly to conduct and maintain the laminar flow. Windows are provided in the walls of the conduit to establish a path for radiant energy used for analysis of the sample fluid core. The sheath of carrier fluid prevents contamination of the window areas by the sample fluid.

*INVENTOR.*
ALLEN STRICKLER

BY

ATTORNEY

SELF CLEANING SAMPLE CELL FOR RADIANT ENERGY ANALYZERS

This invention relates to a self-cleaning flow-through sample cell for analysis of a sample fluid in a radiant energy analyzer and in particular to a laminar flow self-cleaning sample cell for turbidity, nephelometry and absorptiometry measurements.

Turbidity is a measure of the optical property of a fluid sample which scatters and absorbs radiant energy rather than transmitting it totally in a straight line. Instruments for measuring tuibidity generally compare the stremgth of the transmitted beam with the intensity of the beam before it enters the sample. The turbidimeter is based upon the optical property that suspended particles absorb and scatter radiant energy.

Turbidimeters have employed both static and flow-through sample cells. An example of the static sample cell is the well-known Jackson candle turbidimeter consisting of a special candle and a flat-bottom glass tube graduated in turbidity units. Other turbidity measuring instruments, typical of those used for monitoring of water for turbidity, utilize flow-through sample cells wherein a continuous flow of water to be analyzed is established through the cell. The water flowing through the cell is illuminated through windows in the walls of the cell through which the transmission of radiant energy may be observed.

The flow-through sample cell also has further utility in nephelometry and absorptiometry. The nephelometer is a photoelectric turbidimeter which measures radiant energy scattered by a sample. The device is highly sensitive to low concentrations of light-scattering matter, gives zero signal at zero turbidity and has a signal that increases with increasing turbidity. In a conventional nephelometer, response increases to a maximum and then decreases with further increased turbidity.

Absorptiometers measure the radiant energy transmitted through a sample and are insensitive to small turbidities and yield a maximum signal at zero turbidity. The output decreases with increasing turbidity and is highly nonlinear even over a moderate range of turbidities.

The sample cells used in the above instruments introduce many sources of measurement error. Scratches, imperfections in windows, dirt, film, or condensation all scatter and may absorb radiant energy, and give a positive error to turbidity measurement. This is an especially serious problem with low turbidities. The most troublesome scattering results from dirt and film which accumulates during the measurement to produce a constantly changing error.

One method of overcoming the scatter problem in a nephelometer is to eliminate the glass interface by admitting radiant energy through an open and unenclosed upper surface of a liquid sample. This solution to the problem of undesired scattering cannot be used where the liquids are forced through the sample cells under pressure or where the sample cell is located at a low point in the liquid system.

Where turbidity is high, an absorption turbidimeter can be used in which the sample fluid is discharged as a stream from a flat orifice and a radiant energy beam transmitted through the stream. This method of overcoming the scattering problem has the disadvantage of an open sample stream and the problem of collecting the discharge of such a stream.

The rapid fouling of cell windows by suspended matter contained in the sample fluid has been a very serious problem in the continuous monitoring of water for turbidity. The collection of dirt on the cell windows causes erroneous drifting signals, limits the ultimate sensitivity of the instrument and necessitates frequent cleaning of the windows.

Accordingly, it is the object of the present invention to provide a self-cleaning flow-through sample cell through which a sample fluid is conducted for analysis in a radiant energy analyzer.

Another object is to provide a flow-through sample cell having a laminar flow of a sample fluid core within a sheath of carrier fluid.

A further object is to provide a method of preventing a sample fluid containing suspended particles from contacting the walls of a flow through sample cell of the type used in turbidity measurement by establishing a laminar flow of a sheath of premicrofiltered, particle-free carrier fluid about a core of sample fluid.

A specific exemplary embodiment of a self-cleaning flow-through sample cell constructed in accordance with the teachings of the present invention is provided by a pair of concentric conduits, establishing a laminar flow of carrier fluid in a sheath around a core of sample fluid, and a sample cell enclosure attached thereto containing window areas by which radiant energy enters and exits providing measurement of turbidity of the core of sample fluid laminarly flowing therein.

Other features and objects of the invention will be better understood from a consideration of the following detailed description when read in conjunction with the attached drawing in which like reference numerals designate like parts throughout the figures thereof and wherein.

Figure 1:
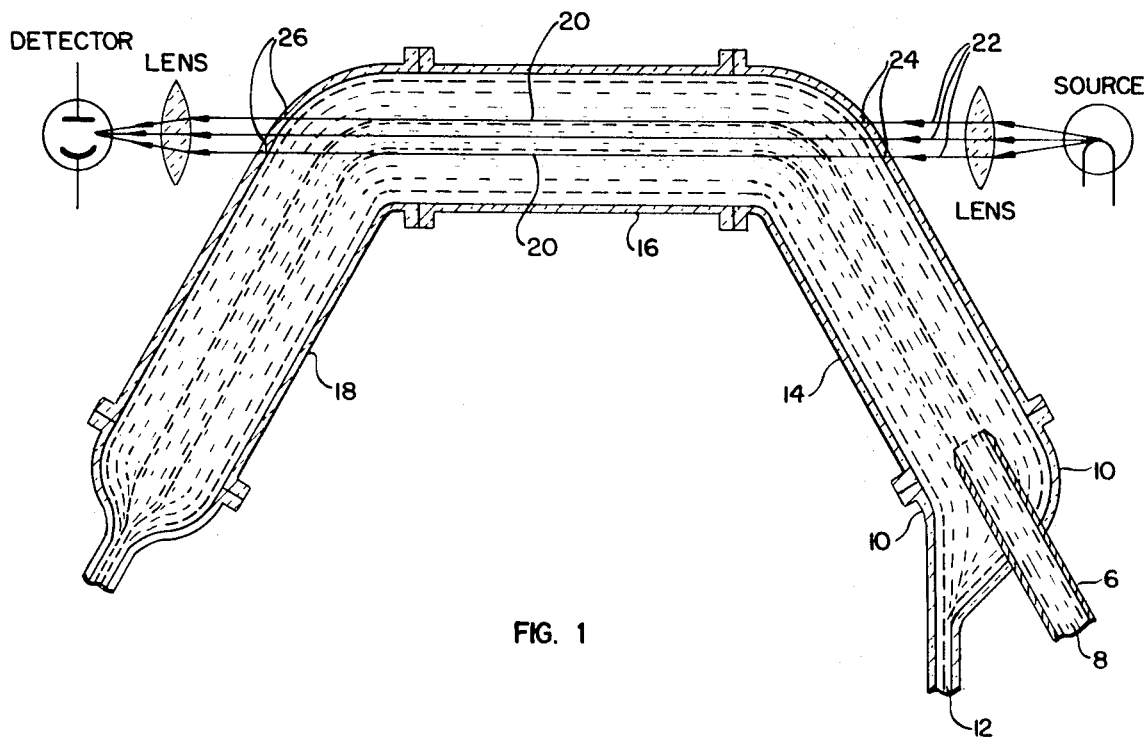
FIG. 1 is a cross section view of a laminar-flow sample cell in the plane of fluid flow illustrating construction in accordance with the teachings of this invention to transmit radiant energy along the axis of the core of sample fluid.

Referring now to FIG. 1, a sample fluid 8 and carrier fluid 12 are introduced respectively by an inner conduit 6 positioned within an outer conduit 10 into a sample cell conduit enclosure comprising curved section 14, straight section 16, and curved section 18. Where the sample cell conduit used is circular in cross section, the conduit 6 may be mounted concentrically within conduit 10. However, there is no restriction as to the cross section configuration and any conduit cross section which establishes and maintains laminar flow may be incorporated. The carrier fluid 12 may be composed of a clear, substantially particle free premicrofiltered fluid such as water. The sample fluid 8 contains the fluid mixture to be analyzed such as turbid water. By means of inner conduit 6 and outer conduit 10, carrier fluid and sample fluid are combined in a laminar flow whereby the carrier fluid forms a sheath around a core of sample fluid. The sample cell conduit sections 14, 16 and 18 are constructed to avoid any sharp irregularities or bends that may impede or destroy the laminar flow of the carrier fluid sheath and sample fluid core through the sample cell. Therefore, as the laminar flow proceeds through the straight section 16, the sample fluid is essentially confined to the central regions of section 16 as defined by dashed boundary lines 20. Radiation from a radiant energy source is directed by a lens along the radiant energy path traced by rays 22 through window area 24 in the wall of curved section 14. The radiant energy rays 22 further continue through the sample fluid core and exit through the window area 26 in curves section 18 to be focused by a lens onto a detector. The detector produces an output signal proportional to the energy transmitted through the sample fluid core. The window areas 26 and 24 may be constructed of individual sections of window material mounted in the walls of curved sections 14 and 18 respectively or the curved sections themselves may be made of window material, as indicated in FIG. 1, thereby making the window area an integral part of the fluid enclosure. Further, although not illustrated in FIG. 1, scattered energy can be measured at straight section 16 by positioning a lens and detector so as to receive scattered radiant energy exiting from the sample fluid perpendicular to the axis of the sample fluid core through a window area contained in the walls of section 16. Similarly, section 16 may also be fabricated from window material as indicated in FIG. 1.

Figure 2:
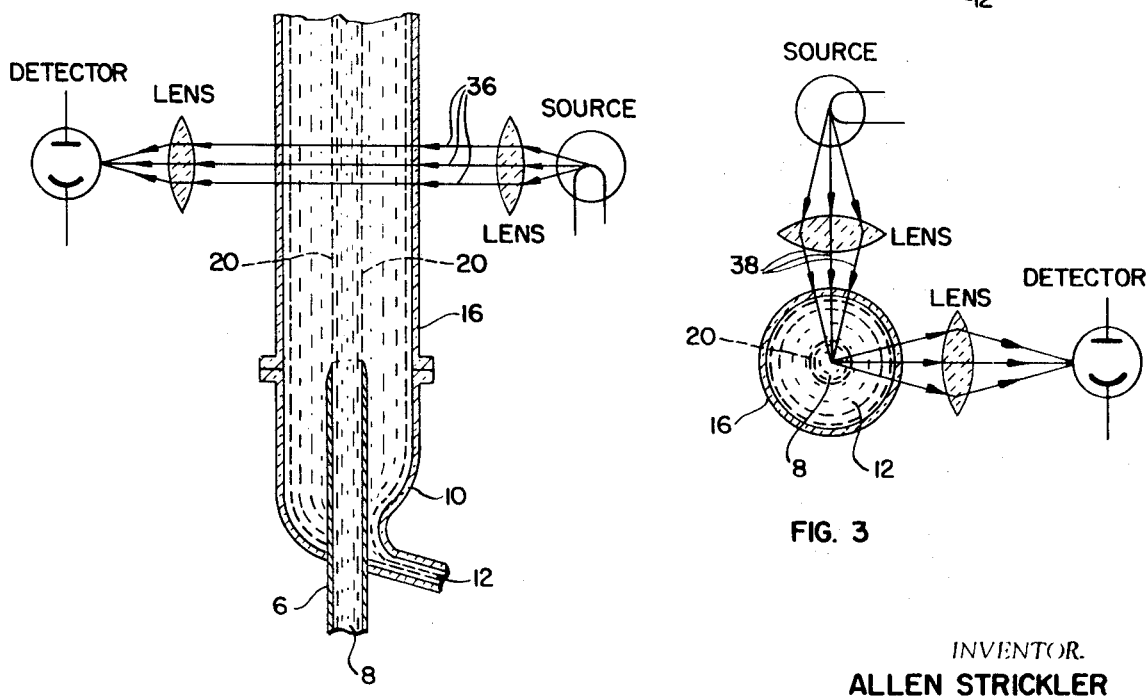
FIG. 2 is a cross section view of a laminar-flow sample cell in the plane of fluid flow illustrating the transmission of radiant energy through the sample fluid core at right angles to the direction of flow.

Turning now to FIG. 2, inner conduit 6 and outer conduit 10 establish a laminar flow of the carrier fluid 12 in a sheath around a core of sample fluid 8 similar to that described hereinabove. The laminar flow is conducted and maintained by the straight section 16. A source of radiant energy and lens establish a radiant energy path traced by rays 36 through the sample fluid core defined by dashed boundary lines 20 at right angles to the direction of fluid flow. This energy may be transmitted through window areas constructed in the straight section 16 or the section itself may be made from window material as indicated hereinbefore. The radiant energy traversing the path defined by rays 36 is further focused by a lens onto a detector and a measure of the transmitted energy is completed thereby. Such an arrangement as illustrated by FIG. 2 is useful for measuring transmission of extremely dense sample fluids where a short transmission path through the sample fluid is desired whereas the arrangement of FIG. 1 is useful in achieving high sensitivities in much less opaque sample fluids where a long sample path is desired.

Figure 3:
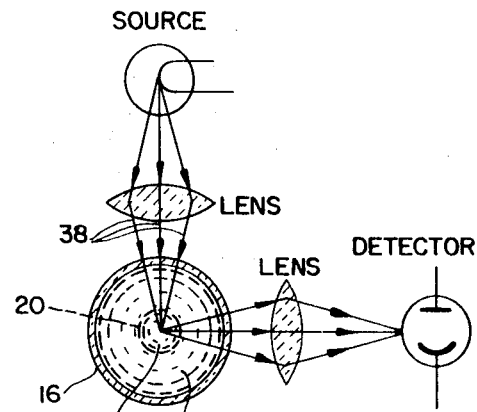
FIG. 3 is a cross section view of a laminar-flow sample cell perpendicular to the plane of fluid flow illustrating scatter radiation measurement.

FIG. 3 illustrates the apparatus arrangement for making a radiation-scattering measurement on the sample fluid as discussed above in reference to FIG. 1. A source of radiant energy and lens are combined to establish the radiant energy path traced by rays 38 so as to focus radiant energy through a window area in sample cell section 16 into the sample fluid core 8 as defined by the dashed boundary line 20 separating the sample fluid core from the carrier fluid 12. The scattered energy is emitted from the fluid core at right angles to the incident energy through another window area and is collected and focused onto a detector by another lens. The detector produces an output which is an indication of the intensity of scattered energy. As discussed hereinbefore, the walls of section 16 may either contain separate segments of window material or may be fabricated entirely from window material.

In operating the sample cell in accordance with the teachings of this invention, the sheath of carrier fluid encloses the core of sample fluid and does not permit the sample fluid to contact the sample cell walls. Therefore, the turbidity particles contained in the sample fluid cannot contaminate or collect upon the windows of the sample cell to cause erroneous indications of radiant energy. The only fluid that contacts the walls is the carrier fluid which is produced by using a premicrofiltered substantially particle-free fluid which is essentially transmittant to the radiant energy used for analysis. The carrier fluid may be obtained by passing the sample fluid through appropriate filters to obtain a particle-free carrier fluid thereby eliminating the need for a separate source of carrier fluid. For example, if the sample fluid is water, the carrier fluid may be particle free, premicrofiltered water. To minimize the frequency of filter change, the volume flow rate of the microfiltered sample fluid to obtain a carrier fluid can be made small. This requires a cell of small cross-sectional area.

Sample flow and conduit size are selected to establish a cross section of fluid flow which mostly comprises the sample fluid core. For example, a regulated flow of prefiltered water can provide a relatively thin sheath around a sample fluid which is water. For the usual requirements of water turbidity monitoring, precision and stability of flow will not be critical.

It now should be apparent that the present invention provides a method and apparatus for obtaining a self-cleaning flow-through sample cell for measuring turbidity of sample fluids without contaminating the sample cell. Although particular components of sample cell structure and arrangement have been discussed in connection with the specific embodiment of the flow-through sample cell constructed in accordance with the teachings of the present invention, others may be utilized. Furthermore, it will be understood that although an exemplary embodiment of the present invention has been disclosed and discussed, other applications and structural arrangements are possible and that the embodiment disclosed may be subjected to various changes, modifications and substitutions without departing from the invention.

What is claimed is:
1. A self-cleaning flow-through sample cell comprising:

a first conduit for conducting fluids in an established pattern of flow and having at least one straight section and at least two curved sections each being respectively attached to opposite ends of the straight section and each curved section containing one window area through which a path for radiant energy is established into said first conduit and along the longitudinal centerline of the straight section and out of the interior of said first conduit; and a second conduit for conducting a sample fluid, said second conduit being disposed within said first conduit to form a space around said second conduit for conducting a sheath of carrier fluid, said second conduit terminating outside said path for radiant energy to unite said sheath of carrier fluid with a core of said sample fluid thereby establishing a pattern of laminar flow-through said path for radiant energy by which said window areas are constantly cleaned by said sheath of carrier fluid and said core of sample fluid traverses the longitudinal centerline of said straight section.